United States Patent [19]
Coulthard

[11] 3,762,221
[45] Oct. 2, 1973

[54] MEASUREMENT OF FLUID FLOW RATES

[76] Inventor: John Coulthard, 1 Greencroft, Redcar, England

[22] Filed: July 6, 1971

[21] Appl. No.: 159,864

[30] Foreign Application Priority Data
July 6, 1970 Great Britain.................... 32,563/70
Jan. 19, 1971 Great Britain...................... 2,593/71

[52] U.S. Cl. ........... 73/194 E, 235/151.34, 235/181
[51] Int. Cl. ............................................... G01f 1/00
[58] Field of Search ..................... 73/194 E, 194 A, 73/194 F, 194 B, 204; 324/77 G; 235/181, 151.34

[56] References Cited
UNITED STATES PATENTS

| | | | |
|---|---|---|---|
| 3,595,078 | 7/1971 | Beck et al. ......................... | 73/194 F |
| 2,202,885 | 6/1940 | Zuschlag........................ | 324/77 G X |
| 3,019,647 | 2/1962 | Beard et al. ......................... | 73/204 |
| 3,158,830 | 11/1964 | Clay, Jr...................... | 324/77 G UX |
| 3,197,625 | 7/1965 | Ratz............................ | 324/77 G X |
| 3,588,699 | 6/1971 | Pysnik............................... | 73/194 E |

OTHER PUBLICATIONS

"Correlation in Action", Hewlett-Packard Journal (Nov. 1969), Vol. 21, No. 3, pp. 17–20

*Primary Examiner*—Charles A. Ruehl
*Attorney*—Young & Thompson

[57] ABSTRACT

Apparatus and a method for measuring the flow rate of a fluid in which a beam of ultrasonic, electromagnetic, optical or other radiant energy is transmitted across the flow at each of two positions spaced apart in the direction of flow, the noise amplitude, frequency or phase modulation on each beam due to disturbances in the flow is detected, and the two resultant signals are cross-correlated to determine the time delay therebetween producing maximum correlation, i.e. the mean fluid transport time between the beams, and thus the mean fluid flow rate.

34 Claims, 9 Drawing Figures

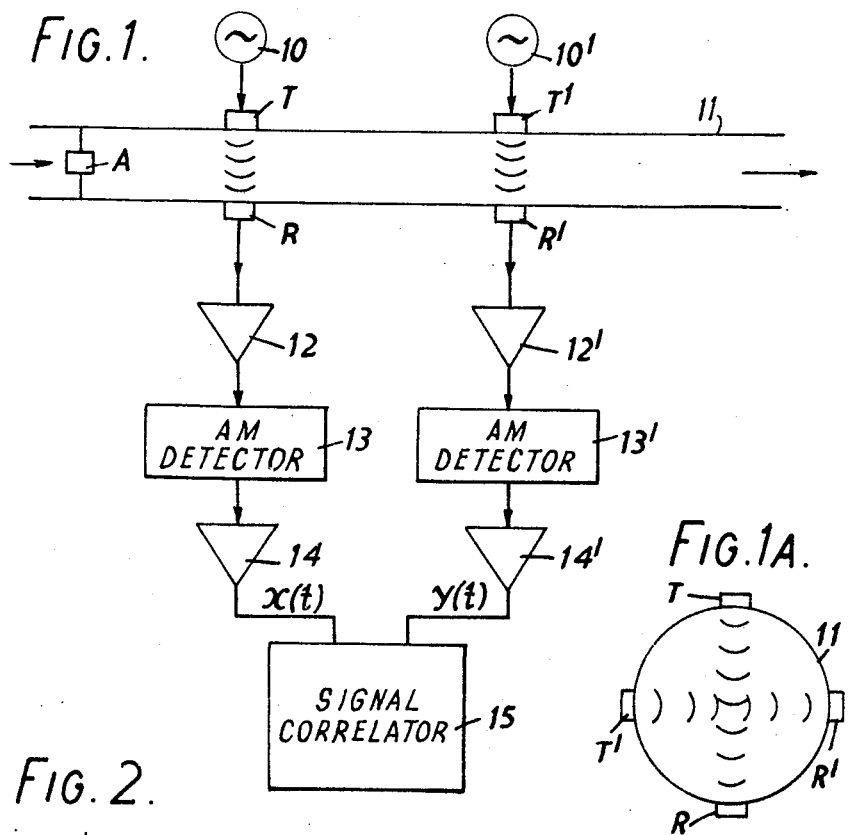
FIG.1.
FIG.1A.
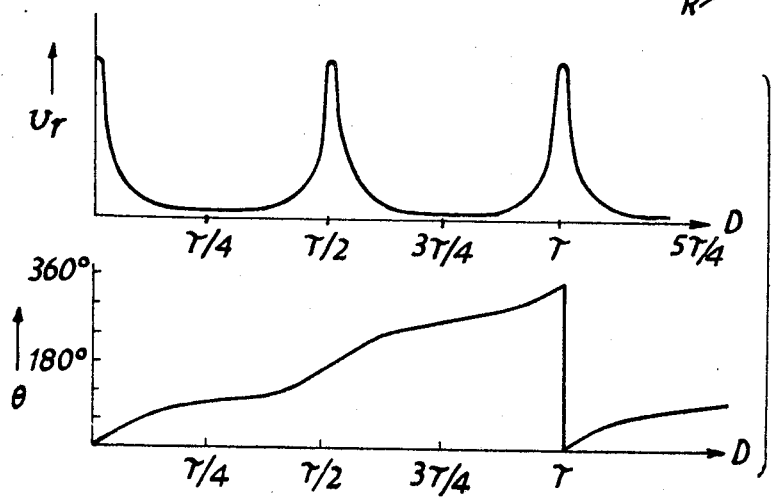
FIG.2.

MEASUREMENT OF FLUID FLOW RATES

This invention relates to the measurement of fluid flow rates.

SUMMARY OF THE INVENTION

According to one aspect of the present invention, a method of measuring the rate of flow of a fluid comprises the steps of transmitting a beam of radiant energy into the fluid at each of two positions spaced apart in the direction of flow of the fluid, receiving the two beams and detecting the noise modulation on each beam due to disturbances in the fluid flow profile, cross-correlating the two detected noise signals, and determining the value of correlation delay producing maximum correlation between the two noise signals.

The value of the correlation delay producing maximum correlation provides a measure of the time taken for disturbances in the flow, which are transported at the mean velocity of the flow, to pass from one position to the other, and thus, if the spacing between the two positions is divided by the value of the correlation delay producing maximum correlation, the mean fluid flow rate is obtained.

It will be apparent that the invention is particularly applicable to measuring the velocity of a highly turbulent flow, as in such a case the disturbances in the flow will be large. However, provided the detection apparatus is sufficiently sensitive, the method may be used for measuring the velocity of a flow which borders on the purely laminar. In the event that the flow is substantially non-turbulent, disturbances may be deliberately induced in the fluid to render the method of the invention more effective.

The two noise signals can be obtained by detecting amplitude, frequency or phase modulation of the beams; various different embodiments of the invention disclosed hereinafter show how these different detection techniques may be employed.

The method may be used to measure the flow rate of a gas, a liquid, or a slurry. Liquids having a large number of scattering centres, e.g. blood or milk, are particularly suited to this technique of measurement, as scattering of the radiated beams is produced and hence the noise signals are strengthened.

In a number of different embodiments of the invention described in detail hereinafter, the two beams of radiated energy lie in the same plane, which also includes the direction of flow, so that the method determines the correlation between the flow profile in said plane at two positions spaced apart along the direction of flow. Alternatively, the two beams may lie in respective different planes each of which includes the direction of flow, so that the flow is only correlated in and near the streamline passing through both beams. For example, the two beams may lie in mutually perpendicular planes and may both pass through the centre of a duct in which the flowing fluid is contained. This latter method is particularly applicable to measuring the flow rates of liquids like blood, due to reflection of the radiated energy from the corpuscles, and is notably useful in surgical applications, as blood flow in a patient can be monitored by transducers clamped to the outside of the patient's body.

A number of alternative type of radiant energy may be employed. Ultrasonic radiation and electromagnetic radiation may be employed, and optical radiation such as laser propagated light may also be used.

In accordance with another aspect of the invention, apparatus for measuring the rate of flow of a fluid comprises means for transmitting a beam of radiant energy into the fluid at each of two positions spaced apart in the direction of the flow of the fluid, means for receiving the two beams and detecting the noise modulation on each due to disturbances in the fluid flow profile, and a signal correlator for cross-correlating the two detected noise signals.

The apparatus may also include means for determining the value of correlation delay producing maximum correlation between the two signals, although this function may instead be performed by an operator.

In embodiments of the invention described in more detail hereinafter, at each of the two positions, an oscillator is connected to a transmitting transducer on one side of a duct carrying the flow, and a receiving transducer is located on the other side of the duct. The electrical output signal from each receiving transducer is passed to an amplitude modulation (AM), frequency modulation (FM) or phase modulation detector to detect the noise modulation thereon. The two resultant detected noise signals are then fed to a signal correlator to determine the delay between them producing maximum correlation. When phase modulation detectors are used the input of the associated transmitting transducer is connected to each detector to enable the modulation of the phase shifts across the beams to be detected.

In a development of the above embodiments, positive feedback is introduced between each receiving transducer and its associated transmitting transducer, whereby no oscillator is needed, the transducer feedback loop self-oscillating at a frequency largely determined by the resonant frequency of the transducers. Such an arrangement obviates any need to continually adjust the frequency used to the resonant frequency of the transducers, to obtain optimum performance, consequent to the resonant frequencies changing due to the effects of temperature, degradation, ageing of the transducers, and so forth.

In another embodiment, the transducers associated with both beams are connected to form a single feedback loop including both beams.

When gas flow is to be measured, the apparatus may be so arranged that a standing wave pattern is set up in the fluid, so that disturbance of the pattern will increase the amplitude of the noise signals.

BRIEF DESCRIPTION OF THE DRAWINGS

A more complete understanding of the invention may be obtained from a consideration of the following description of a number of illustrative embodiments thereof which are given by way of example, having reference to the accompanying drawings, in which:

FIG. 1 shows schematically a first embodiment of apparatus according to the invention, in which amplitude modulation of each of two ultrasonic beams propagated across a duct shown in longitudinal section provides the two noise signals;

FIG. 1A is a partial view of a variation of the embodiment of FIG. 1 in which the duct is shown in axial rather than longitudinal section;

FIG. 2 shows the variation in magnitude and phase of the signal received with the diameter of a duct in which a gas is flowing, a standing wave pattern being set up in the duct;

DESCRIPTION OF THE PREFERRED EMBODIMENTS

Figure 3:
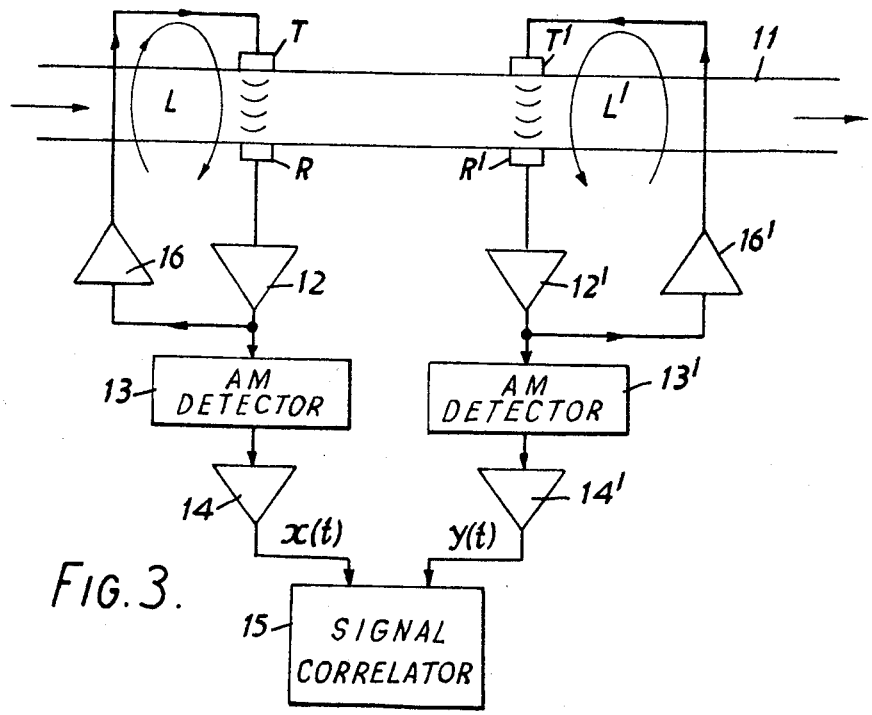
FIG. 3 shows sehcmatically a second embodiment of the invention in which the oscillators of FIG. 1 are replaced by regenerative feedback loops.

In the embodiment illustrated in FIG. 1, oscillators 10, 10' power electrical-to-ultrasonic transmitting transducers T, T' which are mounted on the outside of a duct 11 and are arranged to transmit beams of ultrasonic energy generally at right angles to a fluid flowing in the duct. The two beams lie in a common plane which includes the direction of flow. The frequencies used are preferably in the order of 38–40 kHz for gases, and in the order of 2MHz for liquids, but may vary outside these values in dependence on the fluid under test.

The beams are amplitude modulated by noise comprising disturbances in the fluid and the noise modulated signals are received by receiving transducers R, R' which are mounted on the duct 11 opposite the transmitting transducers T, T' and which convert the modulated ultrasonic signals to electrical signals. These latter signals are amplified by amplifier 12, 12', and after detection by AM detectors 13, 13' the noise signals are amplified by amplifiers 14, 14' to produce two signals $x(t)$ and $y(t)$ which are then passed to a signal correlator 15 to be cross-correlated, the correlation delay for maximum correlation being determined to provide a measure of the mean fluid flow rate.

If the apparatus is to be used in an application where the flow of fluid through the duct 11 borders on the purely laminar, means shown generally at A may be provided upstream of the beams so as to interrupt or agitate the flow and thereby to artificially induce disturbances therein.

In a variation of the FIG. 1 embodiment shown in FIG. 1A the beams lie in respective different planes each of which includes the direction of flow. The planes are orthogonal and intersect in the centre of the duct whereby the apparatus only correlates flow disturbances in and near the streamline through the centre of the duct. As mentioned before, detecting flow disturbance correlation in this fashion is particularly advantageous for measuring the flow rates of liquids such as blood due to reflection of the radiant energy from the corpuscles.

The acoustic reflection coefficient between gas and metal is almost unity, and therefore, for each transducer, in an arrangement as shown in FIG. 1 used for measuring gas flow in a duct having internal walls of metal, the acoustic energy transmitted from one wall into the duct is reflected back from the opposite wall and transmitted back to the first wall where further reflection occurs, this multiple reflection setting up a complex acoustic standing wave pattern.

Thus, for a duct which is circular in cross-section, the magnitude of the voltage output $v_r$ from each receiver transducer R, R' is given approximately by the equation $$v_r = v_o [(\sinh \alpha D \cos kD - j \cosh \alpha D \sin kD)/(\cosh 2\alpha D - \cos 2kD)]$$

and the phase difference between $v_o$ and $v_r$ is given by the equation $$\theta = \tan^{-1} [\cosh \alpha D \sin kD / \sinh \alpha D \cos kD]$$

where
$D$ = the diameter of the duct,
$\alpha$ = the attenuation coefficient,
$k$ = the wave number defined as $2\pi/\lambda$,
$v_o$ = the voltage when D = O, and
$\lambda$ = the wavelength of the radiation used.

The magnitude and phase of each received voltage with respect to the transmitted signals is shown in FIG. 2 where they are plotted against the duct diameter.

When a gas flows along the duct, disturbances in the gas cause compressions and rarefactions to move through the acoustic field patterns set up, causing noise fluctuations in the standing wave system and variations in the amplitude $v_r$ of the signals from the receiving transducers. If the oscillator signals are constant in amplitude and frequency, the r.m.s. values of the signals $x(t)$ and $y(t)$ vary according to the magnitude of the above equation for $v_r$. It follows that the magnitudes of the signals $x(t)$ and $y(t)$ depend upon the length of the acoustic path and the degree of turbulence of the fluid flowing thereacross. If the number of wavelengths in each beam is not identical, a particular disturbance might cause one noise signal to increase and the other to decrease, thereby providing a negative cross-correlation peak, the method of invention thus still being practicable.

The apparatus of FIG. 1 is desirably operated at frequencies which are as close to the resonant frequencies of the transducers as is possible, particularly if high-Q transducers are used, to avoid the loss of high frequency information which would degrade the cross-correlation curve and thereby reduce accuracy. Thus, if the resonant frequencies of the transducers change, due to effects such as ageing, temperature change, the accumulation of dust on the diaphragms of the transducers, and so forth, the oscillator frequencies will constantly require correction. The embodiment of the invention illustrated in FIG. 3 has therefore been devised.

In this embodiment, where the same reference numerals are used for elements corresponding to those used in the embodiment illustrated in FIG. 1, oscillators are not provided. Instead, the amplifiers 12, 12' and 16, 16' form parts of self-oscillating electro-acoustic positive feedback loops L and L' which include the transducers and the acoustic beams, the parameters of the loop components being such that the transducers ensure that the loops oscillate at frequencies largely determined by their own resonant frequencies. The frequencies thus automatically change as the resonant frequencies of the transducers change.

The amplitudes of the oscillations are determined by saturation of the output stages of the amplifiers 16, 16', the signals for detection being picked off at the outputs of the amplifiers 12, 12', before any distortion due to saturation occurs. These signals are directly proportional to the magnitude of the acoustic pressure at the receiving transducers.

Movement of the transducers in directions perpendicular to the direction of flow causes the oscillation frequencies to vary about frequencies centred on the resonant frequencies of the transducers in an accurately predictable manner. When the arrangement oscillates at the transducer resonant frequency conditions exist for obtaining satisfactory cross-correlation between the signals $x(t)$ and $y(t)$.

In tests upon apparatus according to the embodiment of FIG. 3, disturbances of the standing wave patterns set up in the duct provided clear cross-correlation curves and hence accurate measurement of gas flow at velocities ranging upwards from about 4 m/s when the two positions were spaced apart by 25 cm. The system frequencies automatically adjusted in response to environmental changes to produce consistently accurate flow measurements. It was also found that the spacing between the two positions could be increased as the flow rate increased.

It has been found that certain forms of the invention, in certain applications, are subject to inaccuracies due to phase shift between the two beams. It is believed that this inaccuracy is due to displacement of the cross-correlation peak from the position that it would occupy were there no such phase difference, resulting in the measured value of delay for maximum cross-correlation between the two beams differing slightly from the mean disturbance transport time between the two beams. It should be understood that this inaccuracy is found in certain applications only; for example, the apparatus shown in FIG. 1 provides good results when used to measure the flow rate of a liquid, yet provides less satisfactory results when used for measuring the flow rate of a gas. It is believed that the less satisfactory results experienced when this apparatus is applied to measuring the flow rate of a gas may be due to disturbance of the standing wave pattern set up in the gas.

Figure 4:
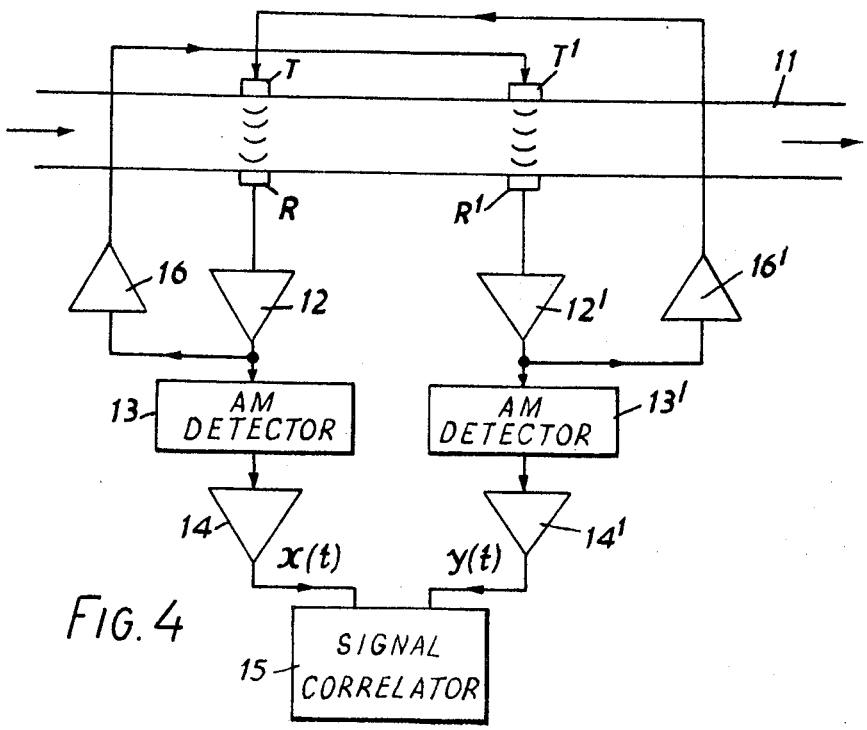
FIG. 4 shows schematically another embodiment in which the oscillators of FIG. 1 are replaced by a single regenerative feedback loop including both beams.

The embodiment shown in FIG. 4 broadly resembles the apparatus illustrated in FIG. 3. In this case, however, the amplifiers 12, 12' and 16, 16', together with the two beams, form a single self-oscillating electroacoustic positive feedback loop. Like the apparatus shown in FIG. 3, the loop oscillates at a frequency largely determined by the resonant frequencies of the transducers, the frequency thus automatically changing as the resonant frequencies of the transducers change. The apparatus shown in FIG. 4 has the advantage that the above-mentioned inaccuracy caused by the effects of phase difference between the two beams is reduced considerably as compared with the apparatus of FIG. 3.

It should be noted that no crosstalk occurs between the two modulating noise signals in FIG. 4 even though they are both incorporated in the same feedback loop. This is because the amplifiers 16, 16' both have saturated outputs whereby the modulation is removed.

It will be apparent that as well as the preferred feedback loop R-12-16-T'-R'-12'-16'-T-R there are two possible subsidiary feedback loops caused by propagation of unwanted beams between T and R' and between T' and R. The apparatus must, of course, be arranged so that the preferred feedback mode is at least predominant. To this end, the transmitting transducers T, T' are relatively matched, and the receiving transducers R, R' are mismatched both mutually and relative to the transmitting transducers T, T'.

Figure 5:
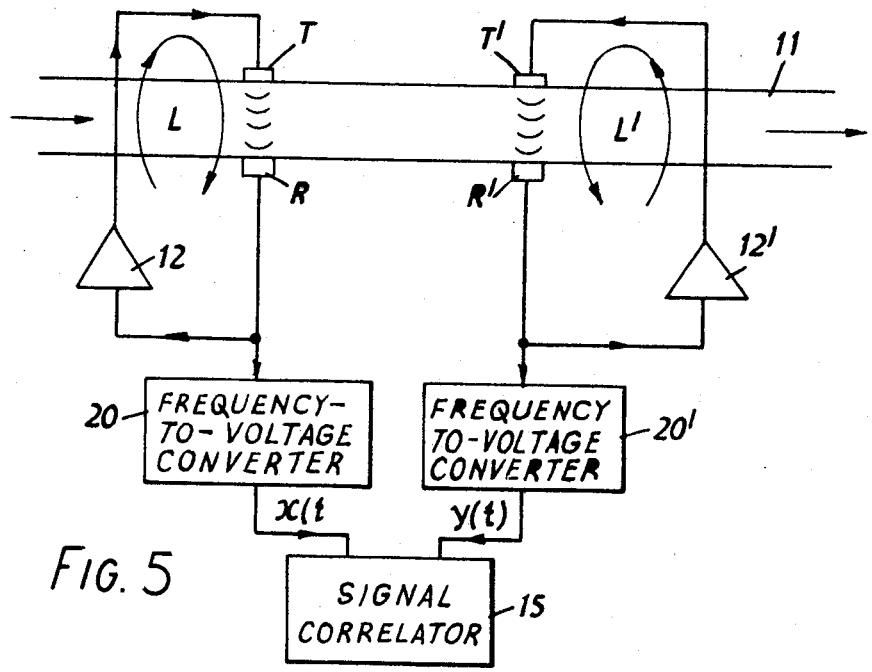
FIG. 5 shows schematically another embodiment in which frequency modulation of each of two beams is detected.

The embodiment illustrated in FIG. 5 is also broadly similar to that illustrated in FIG. 3. Here, however, instead of detecting the amplitude modulation on the beams due to disturbances in the flow, the variation in frequency, i.e. the frequency modulation of the beams due to the disturbances in the flow, is detected by the illustrated frequency-to-voltage converters i.e. FM detectors 20, 20' to provide the signals $x(t)$ and $y(t)$ for correlation.

It will be appreciated that the embodiment of FIG. 5 can be modified by excluding the feedback loops and by using oscillators to power the transmitting transducers as in the embodiment of FIG. 1.

Figure 6:
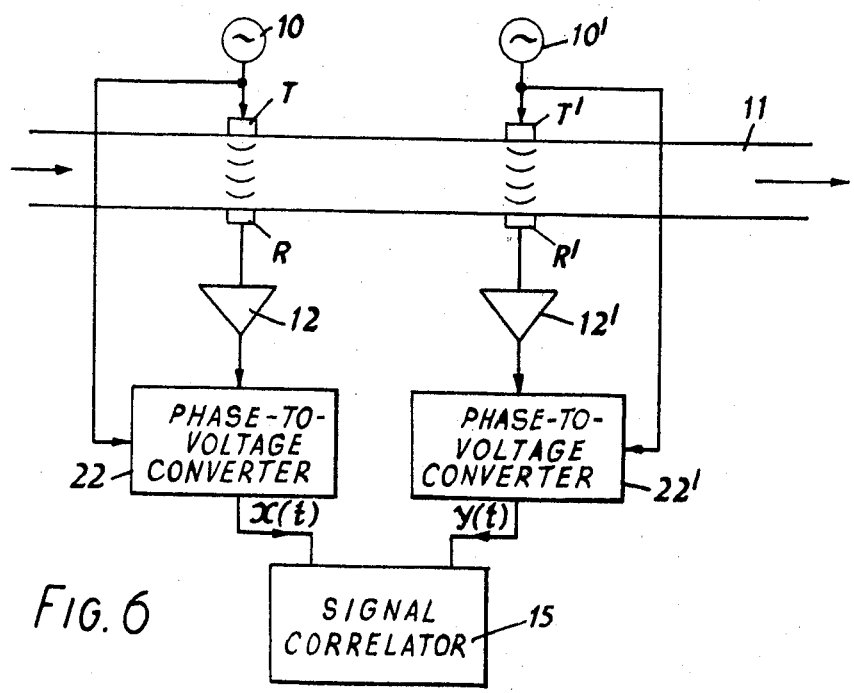
FIG. 6 shows schematically another embodiment in which modulation of the phase shift across each beam due to disturbances in the profile of the fluid flow is detected.

The embodiment of the present invention illustrated in FIG. 6 broadly resembles the apparatus shown in FIG. 1 in that two separate acoustic beams fed by respective oscillators 10, 10' are used. Here, however, instead of detecting amplitude or frequency modulation on the beams caused by disturbances in the fluid flow, the total phase shift across each beam is measured by feeding the oscillator output and the receiver transducer output, for each beam, into a respective phase-to-voltage converter 22, 22'. Due to the fact that a disturbance moving through the two beams causes the phase between the transmitter transducer input and the receiver transducer output to change in a similar manner in each beam, there is no phase shift between the outputs signals of the phase-to-voltage converters 22, 22' and these two signals can be cross-correlated giving a result for the transport time for disturbances between the two beams which is not rendered inaccurate by the above-mentioned phase shift effects.

Figure 7:
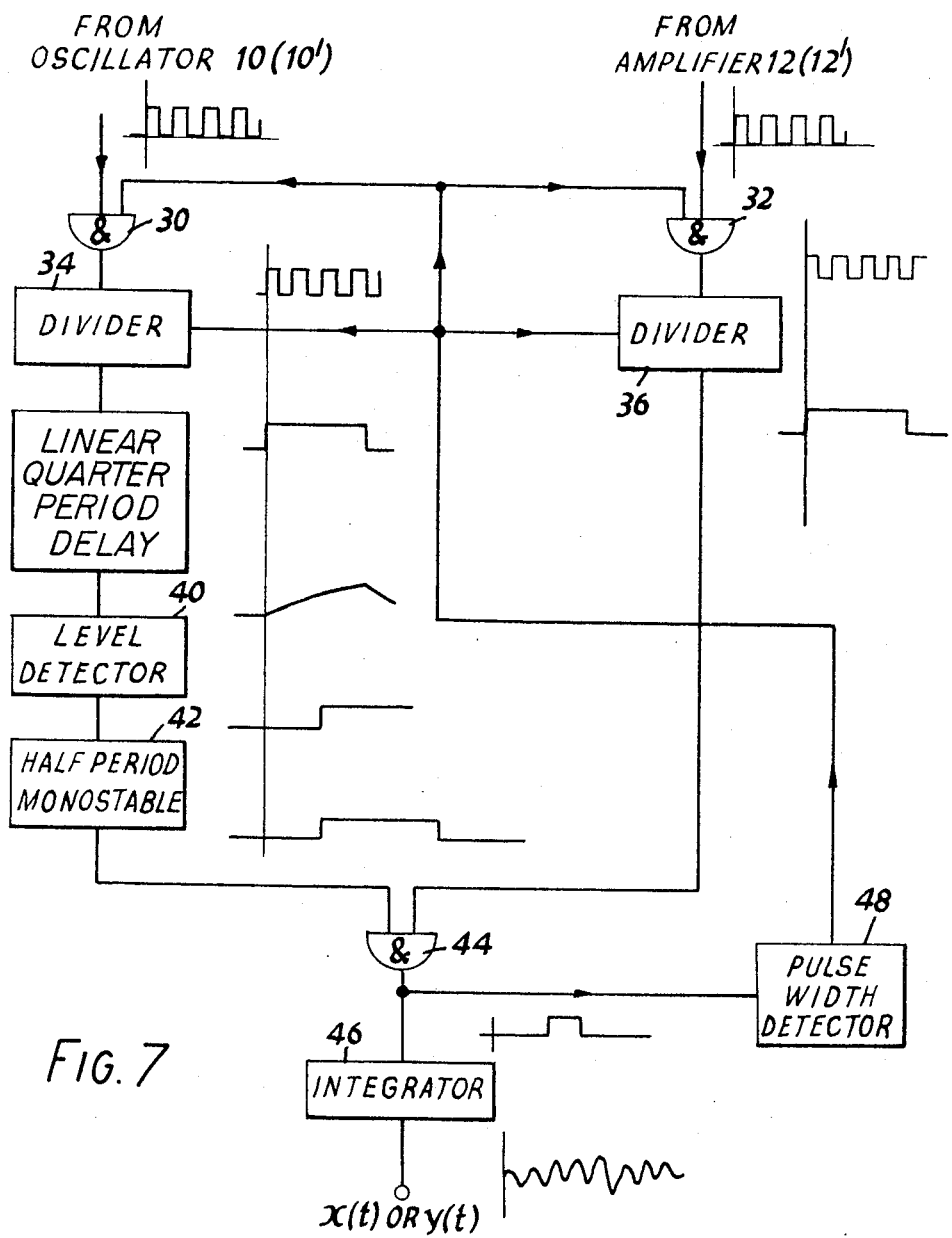
FIG. 7 shows in block diagram form a phase-to-voltage converter for use in the apparatus shown in FIG. 6.

A phase-to-voltage converter suitable for use in either of the two channels in the apparatus of FIG. 6 is shown in FIG. 7 in block diagram form, together with the waveforms appearing at certain points therein. The signals from the output of the oscillator 10 (10') and from the output of the amplifier 12(12') are applied to first inputs of respective gates 30 and 32. These signals are trains of pulses at the ultrasonic carrier frequency which are constantly changing phase relatively to each other due to turbulences in the flow. The outputs of the gates 30 and 32 are connected to divider circuits 34 and 36. In this embodiment these circuits divide by eight although they may, in different applications, be arranged to divide by different figures or not be provided at all. The dividers are only necessary when the apparatus is to be used with ducts having large diameters where they bring the phase shifts within the range of linearity of the converters.

The output signal of the divider 34, which has a period eight times greater than the input signal, is applied to a linear quarter period delay network 38 which gives rise to a ramp waveform at the output thereof as illustrated. The ramp output of the linear quarter period delay network is connected to a level detector 40 which changes state at its output when the input voltage thereof exceeds a predetermined level. This output is connected to a half period monostable circuit 42 to generate the waveform shown.

This waveform is applied to a first input of a further gate 44, the output of the divider 36 being applied to the other input of the gate. Due to the fact that the two input voltages to the gate 44 represent like waveforms displaced in time by a quarter period of the divided waveform and these vary in phase with respect to each other about this mean value as turbulent disturbances move through the beams, the output voltage of the gate 44 is a variable length pulse the length of which is a measure of said phase shift. Successive pulses from the output of the gate 44 are fed to an integrator 46 which thus gives as its output a signal proportional to the mean phase shift across the beam, i.e. $x(t)$ or $y(t)$ as the case may be. It will be appreciated that if the flow velocity is zero, the pulse width of the output waveform of the gate 44 will be constant and thus the integrator output will have a constant d.c. level. When flow occurs, the pulse width varies producing the waveform shown in the form of an a.c. perturbation on a mean d.c. level. To obtain the signal $x(t)$ or $y(t)$ in a.c. form the output of the integrator output is a.c. coupled.

Logic synchronising pulses obtained from a pulse width detector 48 connected to theoutput of the gate 44 are applied to second inputs of each of the gates 30 and 32 and to reset terminals of the dividers 34 and 36. These synchronising pulses are only supplied when the dividers are out of synchronism, as, for example, when the apparatus is first switched on. The pulse width detector 48 detects lack of synchronism because, if the dividers 34 and 36 are not triggered by the leading edge of the same pulse of the ultrasonic carrier waveform, a false pulse width will be obtained, as will be apparent from a consideration of FIG. 7.

Figure 8:
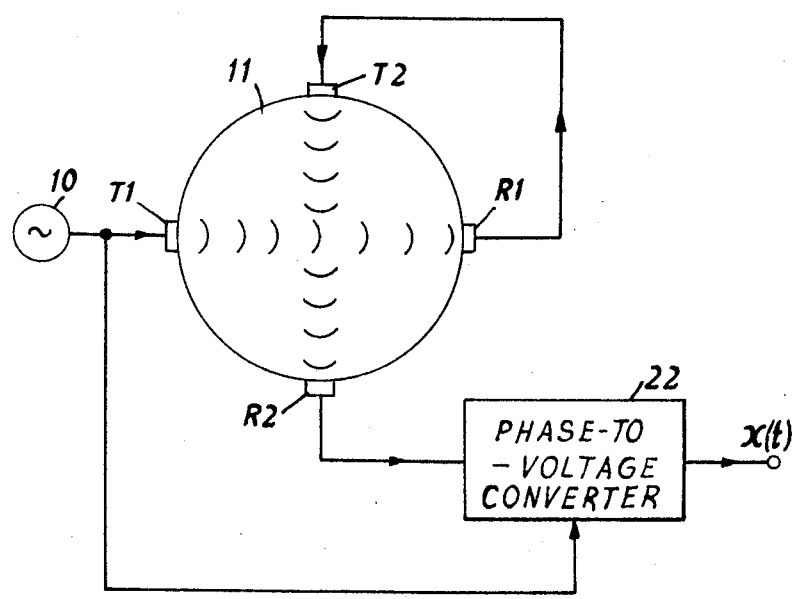
FIG. 8 shows sehcmatically, for one beam only, a variation of the apparatus shown in FIG. 6 in which the beam is passed through the duct twice to reduce errors caused by distortion of the velocity profile.

FIG. 8 shows in block diagram form the apparatus associated with one beam only in a variation of the apparatus illustrated in FIG. 6. In FIG. 8, the duct 11 is viewed in radial section rather than in axial section. The beam of acoustic energy is propagated across the duct twice to give a more accurate measure of the average flow velocity, particularly if the velocity profile is distorted. It is first propagated by transmitting transducer T1, is received by receiving transducer R1 and passed to a second transmitting transducer T2, and finally picked-up by receiving transducer R2. It will readily be seen that the apparatus can be simply modified for three or more passages of the beam across the duct if required to give an even more accurate reading.

It will readily be apparent, from a consideration of the foregoing disclosure, that the invention may be carried out using electromagnetic radiation instead of using ultrasonic energy. The only basic change is to replace the transducers T, T' and R, R', which may be piezoelectric devices, by appropriate means such as aerials for radiating electrical energy into the duct and for receiving the radiation at the other side. The noise signals in this case would be due to modulation of the beams due to changes in the electrical properties of the flowing fluid caused by the disturbances, rather than to changes in pressure caused by the disturbances.

It is also contemplated that an optical analogy of the ultrasonic embodiments can use changes in the optical properties of the moving fluid to modulate beams of light. Thus, the transducers T, T' could be replaced by alternating light sources, and the transducers R, R' by photoelectric detectors. In this connection, lasers could be used in an apparatus corresponding to that illustrated in FIG. 3, a pair of lasers being combined with a mirror arrangement to produce a self-oscillating feedback arrangement analogous to the electro-acoustic feedback loops L, L'.

The present invention can be seen from the foregoing description to provide a method of and an apparatus for measuring the flow rate of all types of fluids, giving results which are absolute and independent of the physical properties of the fluid. As there is no need to obstruct the fluid flow by mounting parts of the apparatus in the flow, dangerous, corrosive, high-pressure and other hostile fluids can safely be monitored.

I claim:

1. Apparatus for measuring the rate of flow of a fluid, comprising means for transmitting a beam of radiant energy, into and across the fluid flow at each of two positions spaced apart in the direction of flow of the fluid, respective receiving means associated with each beam and each positioned to receive the as-sociated beam after passage across the flow, each receiving means producing a beam-representative carrier signal modulated by a noise signal caused by disturbances in the fluid flow profile, a respective detector connected to each receiving means for detecting said noise signals, and a signal correlator for cross-correlating the two detected noise signals whereby the value of correlation delay producing maximum correlation between said two noise signals can be ascertained.

2. Apparatus as claimed in claim 1, wherein the signal correlator includes means for determining the value of correlation delay producing maximum correlation between said two noise signals.

3. Apparatus as claimed in claim 1, wherein said transmitting means is arranged to transmit the two beams in a common plane which also includes the direction of fluid flow.

4. Apparatus as claimed in claim 1, wherein the transmitting means is arranged to transmit the two beams in respective different planes each of which includes the direction of fluid flow.

5. Apparatus as claimed in claim 4, where said two planes are orthogonal.

6. Apparatus as claimed in claim 1, wherein said transmitting means includes a respective transmitting transducer for each beam and wherein said receiving and detecting means includes a respective receiving transducer for each beam.

7. Apparatus as claimed in claim 6, wherein an oscillator is connected to the input of each transmitting transducer.

8. Apparatus as claimed in claim 6, wherein the output of each receiving transducer is connected by a feedback loop to the input of the associated transmitting transducer, each feedback loop having sufficient gain to cause it to self-oscillate so as to produce the associated beam.

9. Apparatus as claimed in claim 8, wherein the parameters of the components of each feedback loop are selected so that it oscillates at a frequency which is near or equal to the resonant frequencies of the associated transmitting transducer and receiving transducer.

10. Apparatus as claimed in claim 6, wherein the output of the receiving transducer associated with a first of the beams is connected to the input of the transmitting transducer associated with the second of the beams and the output of the receiving transducer associated with the second beam is connected to the transmitting transducer associated with the first beam, whereby both beams are included in a single feedback loop having sufficient gain to cause it to self-oscillate to produce said beams.

11. Apparatus as claimed in claim 10, wherein the two transmitting transducers are mutually matched and wherein the two receiving transducers are mismatched both mutually and relative to the transmitting transducers.

12. Apparatus as claimed in claim 6, wherein said receiving and detecting means includes a respective AM detector connected to the output of each receiving transducer for detecting noise amplitude modulation on the beams to provide said two noise signals.

13. Apparatus as claimed in claim 6, wherein said receiving and detecting means includes a respective FM detector connected to the output of each receiving transducer for detecting noise frequency modulation on the beams to provide said two noise signals.

14. Apparatus as claimed in claim 6, wherein said receiving and detecting means includes, for each beam, a respective phase-to-voltage converter having a first input connected to the input of the associated transmitting trans-ducer and a second input connected to the output of the associated receiving transducer, each converter thereby measuring, in use, the changes of phase shift across the associated beam.

15. Apparatus as claimed in claim 14, wherein one or more intermediate transmitting transducers and one or more intermediate receiving transducers are provided for each beam whereby each beam can be passed through the flowing fluid two or more times.

16. Apparatus as claimed in claim 14, wherein each phase-to-voltage converter comprises a linear quarter period delay network having an input connected to said first input thereof, a level detector having an input connected to the output of the linear half period delay network, a half period monostable circuit having an input connected to the output of the level detector, a gate having a first input connected to the output of the half period monostable circuit and a second input connected to said second input of the converter, and an integrator having an input connected to the output of the gate, the output signal of the integrator being one of said two noise signals.

17. Apparatus as claimed in claim 16, wherein each phase-to-voltage converter includes a first divider connected between said first input thereof and the input of the linear half period delay network and a second divider of the same ratio as the first divider connected between said second input thereof and the second input of said gate.

18. Apparatus as claimed in claim 17, wherein each phase-to-voltage converter includes first and second gating means each having a first input connected to a respective one of said first and second inputs of the converter, and a pulse width detector having an input connected to the output of said gate and an output connected to a second input of each of said gating means and to reset terminals of each of said dividers.

19. Apparatus as claimed in claim 6, wherein said transmitting transducers are of the type responsive to an electrical input signal and wherein said receiving trans-ducers are of the type producing electrical output signals.

20. Apparatus as claimed in claim 1, wherein said transmitting means is of the type such that the radiant energy is ultrasonic.

21. Apparatus as claimed in claim 1, wherein said transmitting means is of the type such that the radiant energy is electromagnetic.

22. Apparatus as claimed in claim 21, wherein said transmitting means is of the type such that the electromagnetic radiant energy is within the optical band.

23. Apparatus as claimed in claim 1, including means for inducing turbulence in the flowing fluid, said means being located upstream of both of the beams.

24. A method of measuring the rate of flow of a fluid, comprising the steps of transmitting a beam of radiant energy into and across the fluid flow at each of two positions spaced apart in the direction of flow of the fluid, receiving the two beams after passage across the flow and producing, for each beam, a beam-representative carrier signal modulated by a noise signal caused by disturbances in the fluid flow profile, detecting said noise signals, cross-correlating the two detected noise signals, and determining the value of correlation delay producing maximum correlation between the two noise signals.

25. A method as claimed in claim 24, wherein the two beams are transmitted in a common plane which also includes the direction of fluid flow.

26. A method as claimed in claim 24, wherein the two beams are transmitted in respective different planes each of which includes the direction of fluid flow.

27. A method claimed in claim 26, wherein said two planes are orthogonal.

28. A method as claimed in claim 24, wherein noise amplitude modulation on the two beams is detected to provide said two noise signals.

29. A method as claimed in claim 24, wherein noise frequency modulation on the two beams is detected to provide said two noise signals.

30. A method as claimed in claim 24, wherein noise phase modulation on the two beams is detected to provide said two noise signals.

31. A method as claimed in claim 24, wherein said radiant energy is ultrasonic.

32. A method as claimed in claim 24, wherein said radiant energy is electromagnetic.

33. A method as claimed in claim 32, wherein said electromagnetic radiant energy is within the optical band.

34. A method as claimed in claim 24, having the further step of inducing turbulence in the flowing fluid upstream of both said beams.

* * * * *